United States Patent [19]
Miller

[11] Patent Number: 5,430,659
[45] Date of Patent: Jul. 4, 1995

[54] METHOD AND APPARATUS FOR GENERATING SIGNALS

[75] Inventor: John M. Miller, Kinghorn, Scotland

[73] Assignee: Hewlett Packard Company, Palo Alto, Calif.

[21] Appl. No.: 989,119

[22] Filed: Dec. 11, 1992

[30] Foreign Application Priority Data

Dec. 18, 1991 [EP] European Pat. Off. ............ 91311772

[51] Int. Cl.$^6$ ...................... H04J 13/00; H04L 29/00
[52] U.S. Cl. ................................. 364/484; 364/158;
375/364; 370/82; 370/84; 327/145
[58] Field of Search ................ 364/484, 158, 514, 517,
364/569; 371/5.1, 5.5, 16.5; 341/50, 51, 59;
370/17, 82, 84, 99, 100.1, 105.1; 327/141, 144,
145; 375/106, 112, 113

[56] References Cited

U.S. PATENT DOCUMENTS 5,148,434 9/1992 Richardson ...................... 371/20.1
5,267,236 11/1993 Stephenson, Jr. ................. 370/84
5,337,334 8/1994 Molloy ............................. 327/141

FOREIGN PATENT DOCUMENTS 593518 8/1990 Australia .
0397559 11/1990 European Pat. Off. .
0443029 8/1991 European Pat. Off. .

OTHER PUBLICATIONS

Telcom Report International vol. 14, No. 5, Sep. 1991, pp. 46–48, "New Measuring Technology for SDH".

*Primary Examiner*—Emanuel T. Voeltz
*Assistant Examiner*—Edward J. Pipala

[57] ABSTRACT

An apparatus for generating a control signal including pulses occurring at a first frequency f1 and having an overall mean frequency f2 which is in an exact ratio to the difference between the frequencies of a reference signal N and an offset signal O has a common oscillator 18 operating at the frequency of the reference signal N. The offset signal O is produced from the oscillator 18 by a first channel 24a of a 2-channel direct digital synthesizer (DDS), and the frequency f1 is generated by its second channel 24b. The offset signal O controls the rate at which data is entered into a first-in first-out store (FIFO) 54. The signal from the second channel 24b of the DDS triggers sub-sequences of pulses to produce the required control signal, which modifies the extraction of data from the FIFO 54 occurring at the rate of the reference signal N. Each sub-sequence may include one pulse, no pulse or two pulses. The modifications introduced by the control signal exactly balance the accumulation of a surplus or deficiency of data which arises from the frequency offset between the signals N and O.

The apparatus may be used to synthesize signals for testing communications equipment such as for SONET and SDH networks.

10 Claims, 3 Drawing Sheets

METHOD AND APPARATUS FOR GENERATING SIGNALS

TECHNICAL FIELD

This invention relates to methods and apparatus for generating a signal which, although not regular, includes events (e.g. pulses) occurring at a first frequency and such that the mean frequency of the overall signal over a predetermined time interval is in an exact predetermined ratio to the difference between the frequencies of two other signals.

BACKGROUND ART

In anticipation of substantial future increases in demand for communications facilities (voice, computer data, video, etc.), new systems are being designed with much greater network flexibility, higher speeds and higher traffic capacity than systems presently in use. One particular system, based on optical communications technology, is the Synchronous Optical Network (SONET) and the equivalent CCITT Synchronous Digital Hierarchy (SDH). These systems are intended ultimately to replace the existing so-called plesiochronous (nearly synchronous) systems.

SONET systems incorporate the concept of splitting a stream of data to be transported from a single source (which may be a plesiochronous system) into blocks, and transporting each block (called 'payload') within one or more successive 'frames' which also contain control information (called 'overhead'). This control information enables the system to detect errors and to identify individual payload data streams within an overall stream of frames which may contain multiplexed data from many sources and intended for many destinations. At the most basic level (SONET STS-1), a frame comprises 810 8-bit bytes, 27 of which are assigned to overhead and 783 of which are available for payload data; during transmission of a frame, overhead and payload data alternate, in a pattern which comprises 3 bytes of overhead followed by 87 bytes of data and which occurs a total of 9 times. 8000 such frames are transmitted per second, giving an overall bit rate of 51.84 MHz. Higher level signals may also be produced. For example, three STS-1 signals may be interleaved to create an STS-3 signal, with a bit rate of 155.52 MHz; during transmission of an STS-3 frame the overhead and the payload data alternate in a pattern comprising 9 bytes (72 bits) of overhead (three from each component STS-1 signal) followed by 261 bytes (2088 bits) of data. Alternatively, a so-called STS-3c concatenated signal may be created containing a single signal payload with three times the capacity of an STS-1 signal (2349 bytes), 81 bytes of overhead and a bit rate of 155.52 MHz.

The size of each block of payload data and the payload capacity of a SONET frame are the same, but the SONET system does not require the start of a block (the 'payload envelope') to be coincident with the start of the payload portion of a frame. In order to facilitate efficient multiplexing and transfer of signals between different SONET systems, the payload envelope may start anywhere within the payload portion of the frame, and carry over into the following frame. For each SONET signal the overhead information includes a value (the 'payload pointer') which identifies which byte of the payload portion comprises the first byte of the payload envelope starting in that frame.

Although the component equipments of a SONET system are synchronized in operation, it is essential for the system to be able to accommodate slight perturbations in clock signal frequency and phase. Such perturbations can occur, for example, where a signal is transferred from one SONET system to another (e.g. a connection at national boundaries or between systems belonging to different operators), or if a master system clock signal source fails and individual system components have to rely on local stand-by clock signal sources.

The effect of such perturbations is to cause either a surplus or a deficiency of data to accumulate. Thus, if the clock frequency of a SONET system upon which data are arriving at a connection is offset fractionally below the frequency of the system upon which data are leaving the connection, a cumulative deficiency of a complete byte will periodically arise. When this occurs, an 'empty' byte is included among the payload data bytes in the frame being assembled at that time (at a predefined position within the payload portion of the frame); thus the payload envelope including that data uses 784 byte positions to transmit 783 actual bytes, and the deficiency is compensated. The payload pointer for the following, normal payload envelope is incremented by one relative to that for the 'extended' payload envelope, to reflect the fact that the first byte of the following envelope must occur one byte later relative to the start of its frame than did the first byte of the 'extended' payload envelope.

Likewise, if the incoming clock frequency is offset fractionally above that of the outgoing clock, a surplus of one byte will periodically accumulate. In this case one byte of data for the frame being assembled is placed in a predefined, normally spare byte location in the overhead, rather than in the payload envelope as usual; thus that frame transmits the required 783 data bytes using only 782 byte positions within the payload envelope itself, and the surplus is absorbed. The payload pointer for the following, normal payload envelope is decremented by one relative to that for the 'condensed' payload envelope, to reflect the fact that the first byte of the following envelope now occurs one byte earlier relative to the start of its frame than did the first byte of the 'condensed' payload envelope.

In the case of an STS-3c concatenated signal there is a single payload pointer and changes are made in steps of three bytes; thus an 'extended' STS-3c payload envelope uses 2352 byte positions to transmit 2349 actual bytes, and a 'condensed' payload envelope transmits 2349 bytes using only 2346 byte positions within the payload envelope itself.

During normal operation a pair of SONET systems will be highly synchronized, and frequency variation will appear mainly as long-term (e.g. diurnal) wander; however, during fault hold-over conditions a small frequency offset may appear, possibly with short-term fluctuations superimposed. Resulting changes in payload pointer values will arise at intervals of the order of 10's to 100's of milliseconds or longer (e.g. every 300 to 3000 frames or more). Under fault hold-over conditions there may be a generally steady sequence of such payload pointer changes. The net result is that the payload envelopes appear to 'move' progressively relative to the fixed sequence of SONET frames.

In testing a SONET system, it is important to be able to confirm that the system will correctly regenerate the original input data stream without unacceptable distortion caused by timing discontinuities introduced by such payload pointer changes. In the case of a test-set for generating a simulated SONET traffic stream, it is therefore necessary to be able to generate SONET frames in which, in the worst case, the payload pointer values progressively change to simulate frequency-offset induced 'movement' of the payload envelopes relative to the SONET frames, and in which occasional perturbations in the form of additional changes in payload pointer values are superimposed in order to simulate the effects of frequency disturbances such as jitter. Thus in one specified test involving measurements over a period nominally 30 seconds in duration, pointer changes with a spacing of between 36 ms and 10 s are required (corresponding to a total of between 830 and 3 changes) to simulate frequency offset, but perturbed with either one additional pointer change superimposed or one normal change suppressed. In other circumstances a signal may be required with a generally regular sequence of pointer changes, but with intermittent bursts of several additional or suppressed changes.

The synthesis of such a test signal presents a problem: the number of pointer changes and more particularly the times at which they become necessary are dependent upon the offset between the payload envelope frequency and the SONET frame frequency. Arbitrarily triggering pointer changes every 36 ms, for example, would not suffice, since the changes would not necessarily be synchronized with the frame sequence and might not accurately reflect the cumulative offset between the frame sequence and the payload envelope sequence, thereby leading to a net excess or deficiency of data.

In addition, the requirement to superimpose or suppress one or more pointer changes during each measurement period introduces an irregularity into the sequence of pointer changes, but the specified period between pointer changes must be maintained apart from this exception. Simply increasing or decreasing the number of bytes to be transmitted would not suffice, since that would result in pointer changes every 1/(n+1) or 1/(n−1) seconds (for one change more or one change fewer) instead of the desired spacing of 1/n seconds.

It is required therefore, in general terms, to produce an irregular signal (in this case, including events or pulses indicating that pointer changes are required) with the property that the mean frequency of occurrence of events over some predetermined time interval (in this case, the measurement period) is in a predetermined exact integer ratio to the frequency difference between two other signals (in this case, the frame sequence and the payload envelope sequence), and including events which occur at another predetermined frequency (in this case, the unperturbed rate of pointer changes).

Disclosure of Invention

According to one aspect of this invention there is provided a method of generating a first signal (for example a train of pulses) including events (such as pulses) occurring at a first predetermined frequency f1 and such that all events occurring in a predetermined time interval have a predetermined mean frequency f2 which is in an exact predetermined ratio to the difference df between the frequencies of second and third signals, comprising the steps of:

generating a fourth signal at a frequency f3;

generating from said fourth signal a fifth signal at a frequency f3+df;

deriving said second signal from said fourth signal and said third signal from said fifth signal;

generating, from said fourth signal, an intermediate signal at said frequency f1 and in a predetermined ratio to said difference frequency df;

generating a perturbation signal which has a mean frequency over said predetermined time interval which is equal to the difference between said frequencies f1 and f2; and combining said intermediate and perturbation signals to form said first signal.

In one embodiment data is entered into an elastic store at a rate proportional to the frequency of one of said second and third signals, and extracted from said store at a rate proportional to the frequency of the other of said second and third signals, and with control of flow of data from said elastic store being dependent at least upon said first signal. Alternatively a gapped version of said second signal may be generated in dependence at least upon said first signal, and a data generator clocked with said gapped version of said second signal such that the data rate is proportional to said third signal. The fifth signal and the intermediate signal may be generated from the fourth signal by phase accumulation.

According to another aspect of the invention there is provided apparatus for generating a first signal including events occurring at a first predetermined frequency f1 and such that all events occurring in a predetermined time interval have a predetermined mean frequency f2 which is in an exact predetermined ratio to the difference df between the frequencies of second and third signals, comprising:

means for generating a fourth signal at a frequency f3;

means for generating from said fourth signal a fifth signal at a frequency f3+df;

means for deriving said second signal from said fourth signal and said third signal from said fifth signal;

means for generating, from said fourth signal, an intermediate signal at said frequency f1 and in a predetermined ratio to said difference frequency df;

means for generating a perturbation signal which has a mean frequency over said predetermined time interval which is equal to the difference between said frequencies f1 and f2; and means for combining said intermediate and perturbation signals to form said first signal.

The invention described herein enables the generation of irregular signals with exact frequency ratios, and independently of drift in the frequency of either signal to which the irregular signal is related.

BRIEF DESCRIPTION OF DRAWINGS

A method and apparatus for generating signals in accordance with this invention will now be described, by way of example, with reference to the accompanying drawings, in which.

BEST MODE FOR CARRYING OUT THE INVENTION, & INDUSTRIAL APPLICABILITY

The invention will be described in the context of the synthesis of a SONET STS-3c concatenated signal intended for testing the effect on the operation of SONET signal transmission equipment of payload pointer changes arising from frequency offsets and phase variations. However, it should be understood that the invention is applicable both to testing SONET equipment operating at other signal rates and levels, to equivalent SDH systems (e.g. using SDH STM-1 signals) and more generally to other situations in which irregular signals having a precise mean frequency are required. The synthesis of a complete STS-3c signal requires several steps in addition to those relating to the present invention; however, such additional steps form no part of the present invention, are not required for a full understanding of the invention and are known to those of ordinary skill in the art. Accordingly those additional steps are not described in detail herein.

In use, the synthesized STS-3c signal is required to contain frames at the correct rate (8000 frames/s) and in which the payload envelope 'moves' occasionally relative to the frame sequence as described above, with associated changes in the value of the payload pointer. For each test, the user needs to be able to set the interval between changes in pointer value, within the range 36 ms to 10 s as set out in the relevant test specification. Any given period will correspond to a particular value of frequency offset to be simulated —a larger frequency offset will result in faster accumulation of a surplus or deficiency of data, and thus a shorter period between compensatory pointer changes.

The pointer changes may be in either direction: increments ('empty' bytes) or decrements ('extra' bytes). In addition, the user is able to select additional 'perturbations' to be imposed on the signal: in the present example, these perturbations involve one extra payload pointer change during the measurement period, which may be either an increment or a decrement. However, it should be noted that the invention is not restricted to cases in which the irregularity comprises the addition or deletion of only a single member from a sequence. For other tests it may be desired to include perturbing bursts of several additional or missing pointer changes.

Figure 1:
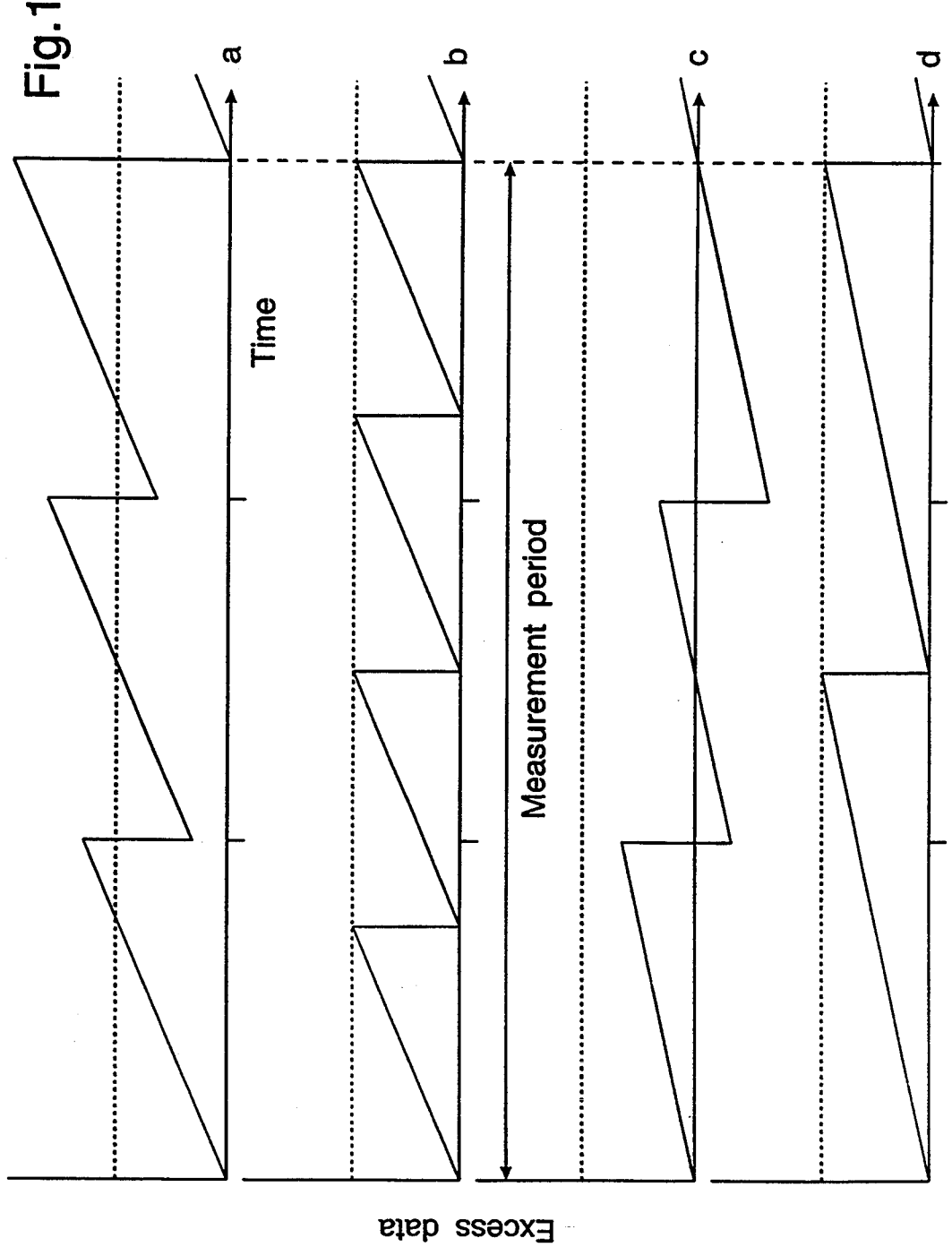
FIG. 1 illustrates graphically the effect provided by the present invention.

FIG. 1 illustrates a simplified case, in which the user has requested a test signal with three opportunities for payload pointer changes equi-spaced through a measurement period. In each graph the sloping lines indicate the accumulation of dam, for example in a first-in first-out (FIFO) buffer, at a rate proportional to the frequency offset being simulated (the slope of the line). The horizontal dotted line shows the threshold level at which the accumulation of data would exceed one complete unit for transfer of data (e.g. one byte). Vertical line segments indicate actual pointer changes, when accumulations of data are compensated. Tick marks along the time axis indicate when the pointer changes requested by the user should occur.

In FIG. 1a the desired sequence is shown, for 'extra' bytes (gradual accumulation of data), and with one additional pointer change: thus there is one pointer decrement after one-third of the measurement period, another after two-thirds, and two changes at the end of the period in quick succession (actually four frames apart, the minimum permitted by the SONET specification). FIG. 1b shows the (undesirable) effect of simply supplying the data stream to a free-running FIFO: every time the accumulation of data exceeds the threshold level, an extra byte is inserted and a pointer change is made (it should be noted that during the measurement period approximately 240,000 SONET frames are being synthesized). Thus there would actually be four separated pointer changes, and no double change. Likewise, FIG. 1c illustrates the desired sequence again for 'extra' bytes, but with one pointer change suppressed (again at the end of the period). FIG. 1d shows the result of using a free-running FIFO: there are two changes but at the wrong spacing, and no suppressed change at the end. In practice, the FIFO might sometimes overflow (if data were accumulating) or empty completely, if a deficiency of data were being simulated.

Figure 2:
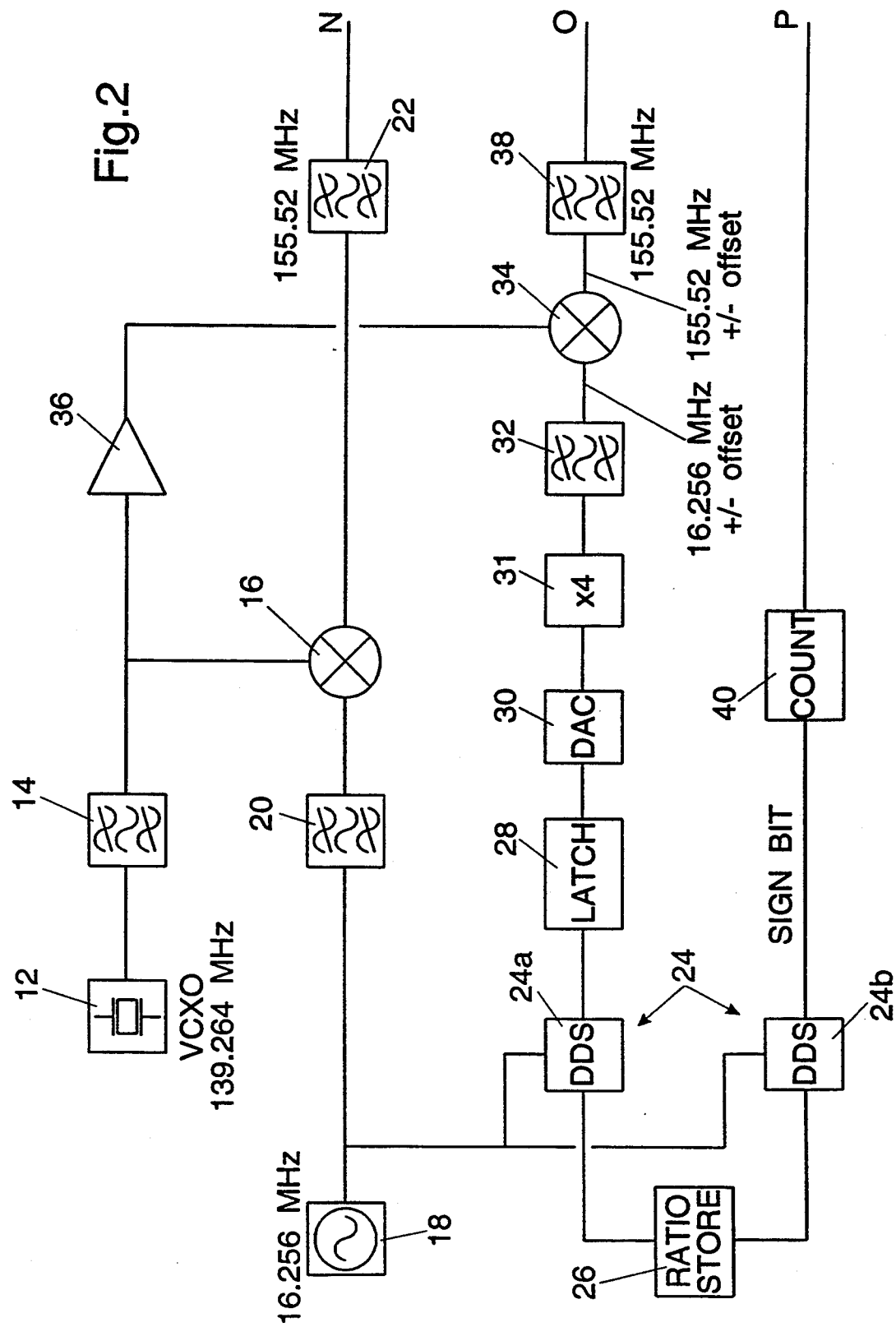
FIG. 2 is a block schematic diagram of a first part of an apparatus in accordance with the invention.
Figure 3:
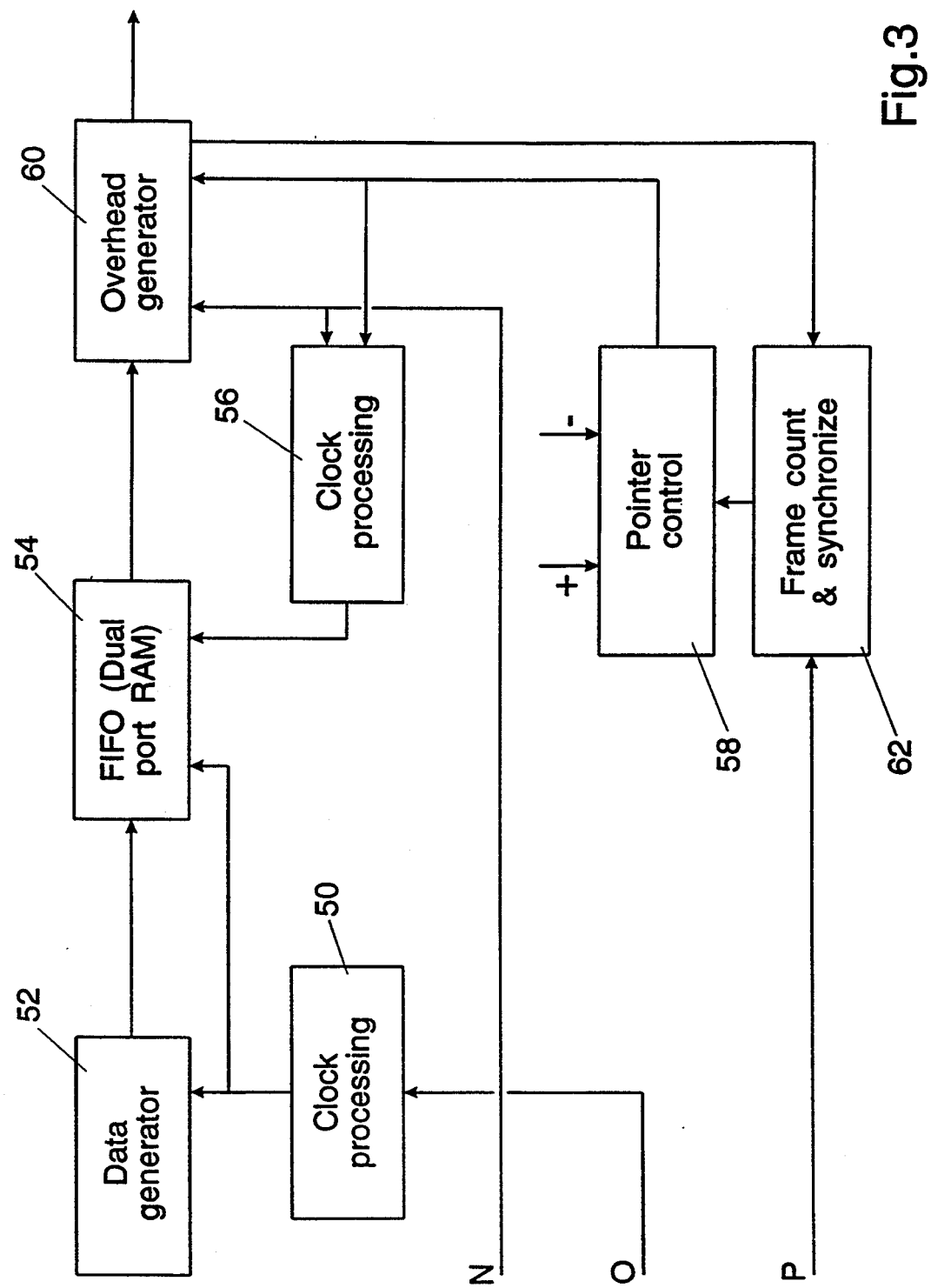
FIG. 3 is a block schematic diagram of a second part of the apparatus.

The circuit shown in FIGS. 2 and 3 is arranged to avoid this problem.

Referring to FIG. 2, a voltage-controlled oscillator (VCXO) 12 provides a pulsed signal at a bit rate of 139.264 MHz, which is supplied via a band-pass filter 14 to a mixer 16. A crystal oscillator 18 supplies a second pulsed signal at a bit rate of 16.256 MHz via another band-pass filter 20 to the mixer 16. The frequencies of the oscillators 12 and 18 are chosen so that the frequency of the sum signal produced by the mixer 16 is 155.52 MHz, that is the nominal bit rate of a SONET STS-3 signal. This sum signal is supplied via a band-pass filter 22 as a nominal clock signal N. If desired, the VCXO 12 may form part of a phase-locked loop (not shown) for synchronizing the nominal clock signal N with signals elsewhere in the test equipment.

The output of the crystal oscillator 18 is also supplied as the clock input signal to both channels 24a and 24b of a dual-channel direct digital synthesizer (DDS) 24, which may be for example a Q2334 Dual Direct Digital Synthesizer made by Qualcomm, San Diego, Calif., U.S.A. Each channel of the DDS 24 also receives a respective ratio control signal from a ratio store circuit 26 (which may be for example a store arranged to supply values from a look-up table in accordance with user input selections). As is well known to those skilled in this art, each channel of the DDS 24 operates by phase accumulation to generate a sequence of digital values representing samples of a signal derived from its 16.256 MHz input signal, the frequency of the output signal being at an integer ratio i/j to the input signal frequency in accordance with the value of the respective ratio control signal (i) and the resolution (j) of the DDS (in the case of the Q2334 this resolution is $2^{32}$).

The output signal from the DDS channel 24a is supplied via a latch 28 to a digital-to-analogue converter (DAC) 30 which produces the actual amplitude-sampled signal represented by the sequence of digital samples from the DDS 24a. The pulsed signal from the DAC 30 is supplied via a ×4 frequency multiplier 31 and a band-pass filter 32 to a mixer 34, which also receives the 139.264 MHz signal from the VCXO 12, via a buffer amplifier 36. The sum signal from the mixer 34 is supplied via a band-pass filter 38 as an offset clock signal O. When the ratio control signal supplied to the DDS 24a is such that the output frequency of the frequency multiplier 31 is the same as the frequency of the clock input signal to the DDS 24a (16.256 MHz), the frequency of the offset clock signal O is 155.52 MHz, that is the same as the nominal clock signal N. Other values for the ratio control signal supplied to the DDS 24a will cause the frequency of the offset clock signal O to be offset correspondingly from this value. The possible values for this ratio control signal are chosen to provide frequency offsets which correspond to the mean period between pointer changes (in the case of unperturbed changes, the mean period will be the actual userselected interval between pointer changes; in the case of the perturbed changes the mean period will differ slightly from the user-selected value to take into account the perturbations).

The ratio control signal supplied to the DDS 24b is likewise chosen to provide outputs at some integer multiple (which may include unity) of the user-selected period between pointer changes (perturbed or unperturbed).

The output signal from the DDS channel 24b (more specifically the sign bit of that signal) is supplied to a divider 40 which is loaded with a value dependent upon the desired regular interval between payload pointer changes. Since each successive cycle of the signal from the DDS 24b involves two changes in sign, the divider 40 effectively counts cycles of that signal. The value loaded into the divider 40 is chosen in accordance with the number of such cycles which will occur within the interval set by the user. The output from the divider 40 is therefore a signal (the intermediate pointer signal P) which indicates the occurrence of an opportunity for possible inclusion of an 'empty' byte in the payload envelope of one or more frames (at least four frames apart), or for possible insertion of a data byte in the reserved, normally empty location in the overhead of one or more frames, in either case together with the associated change in payload pointer value.

By way of example, for a nominal interval between payload pointer changes of 100 ms and a test period 30.36875 s in duration, the actual ratio supplied to the DDS 24b may be 2610, giving an actual interval of $1/(2610*16256000/2^{32}) = 101.23$ ms. The corresponding ratio supplied to the DDS 24a may be $(r+/-16254)$, for a frequency offset from the nominal value by $16254*16256000/2^{32}*4 = +/-246.079$ Hz (one additional 'extra' or 'empty' byte), or $(r+/-16146)$, for a frequency offset by $16146*16256000/2^{32}*4 = +/-244.444$ Hz (one 'extra' or 'empty' byte suppressed), where r is the ratio which yields the frequency of the nominal clock signal.

Referring now to FIG. 3, the offset clock signal O is supplied to a first clock processing circuit 50, which inserts gaps in the clock signal corresponding to periods when overhead data are to be transmitted rather than payload data. Thus, for an STS-3c signal, the output of the circuit 50 comprises blocks of 2088 clock pulses (the duration of the payload portion of a frame) separated by gaps which are 72 pulses in duration (for the overhead). Nine sets of 72-pulse gaps and 2088-pulse blocks are needed for one frame.

This gapped clock signal at the offset bit rate is supplied to a data generator 52 and to a first clock input of a first-in first-out (FIFO) elastic store 54, which may be constituted in known manner by a dual-port random-access memory (RAM). The data generator 52 produces a sequence of binary test data digits, which may for example incorporate a pseudo-random binary sequence (PRBS) and which are to be incorporated in the STS-3 test signal and applied to the SONET equipment to be tested. The generation of these data and their transfer into the FIFO are synchronized by the gapped clock signal from the circuit 50.

The nominal clock signal N is likewise supplied to a second clock processing circuit 56, which also receives a signal from a pointer control circuit 58. This pointer control circuit receives the intermediate pointer signal P (after synchronization with the signal frames as explained below) plus a user-controlled indication of whether the synthesized STS-3 signal should include positive pointer changes ('empty' bytes to be included) or negative pointer changes ('extra' bytes to be included in the normally spare locations in the overhead), and whether the perturbations involve addition or suppression of pointer changes. This indication is coordinated with the value of the ratio control signal which is supplied to the DDS 24a, and in particular with the direction (low or high respectively) and amount of the frequency offset which that value produces. The pointer control circuit may also receive an indication of the frequency and duration of any bursts of several pointer changes that may be required. The pointer control circuit 58 provides a synchronized pointer change signal to the second clock processing circuit 56 each time a change in pointer value should occur, indicating whether a positive or negative change is required.

The excess or deficiency of data bytes produced by the offset clock signal O generated by the DDS 24a is exactly balanced by the pointer changes stimulated by the synchronized pointer change signal, in both the perturbed and unperturbed cases. Thus the overall mean frequency of the pointer change signal from the pointer control circuit 58 is in an exact ratio to the difference in frequency between the clock signals O and N. Because the clock signals are bit-related whereas the pointer change signals are byte-related, the ratio is a factor of 8.

For each frame the second clock processing circuit 56 generates one of three sequences of gapped clock signals, at the nominal bit rate for a concatenated STS-3c payload, depending on whether a normal frame, a frame with an 'empty' byte (positive pointer change) or a frame with an 'extra' byte (negative pointer change) is to be produced:

Normal frame: 9 sets of 72-pulse gaps and 2088-pulse blocks (as for the first clock processing circuit 50)

'Empty byte' frame: 3 sets of 72-pulse gaps and 2088-pulse blocks; 1 96-pulse gap and 2064-pulse block; 5 sets of 72-pulse gaps and 2088-pulse blocks.

'Extra byte' frame: 3 sets of 72-pulse gaps and 2088-pulse blocks; 1 48-pulse gap and 2112-pulse block; 5 sets of 72-pulse gaps and 2088-pulse blocks.

Thus, for an 'empty byte' frame, the fourth block of bytes in the payload portion is only 258 bytes long, preceded by three 'empty' bytes; for an 'extra byte' frame, the fourth block of bytes in the payload portion is 264 bytes long, the first three of these occupying the normally spare locations in the overhead.

The gapped clock signal from the second clock processing circuit 56 at the nominal bit rate is used to gate the transfer of data from the FIFO 54 to an overhead generator 60, which synthesizes the system control and error detection data to be included in the overhead portion of each STS-3 frame and, in synchronism with the nominal clock rate signal N, inserts these data into the gaps provided by the gapped clock signal in the data stream from the FIFO 54. The overhead generator 60 also receives the pointer change control signal from the pointer control circuit 58, and alters the value of the payload pointer in the overhead as necessary in accordance with this control signal.

The final synthesized STS-3 signal, incorporating payload pointer changes as required, is taken from the overhead generator 60 for final processing, such as parallel-to-serial conversion and conversion to optical form, and application to the SONET system to be tested. In addition, a frame synchronizing signal indicating successive frames is supplied by the generator 60 to a frame count and synchronizing circuit 62, which also receives the intermediate pointer signal P. This circuit 62 forwards the intermediate pointer signal to the pointer control circuit 58 in synchronism with the generation of frames by the generator 60, so that introduction of 'empty' or 'extra' bytes and associated pointer changes can be stimulated at the correct point within a frame. The frame count and synchronizing circuit 62 can also provide a count of frames between pointer changes, for example to space changes four frames apart when two or more changes are needed in quick succession.

The effect of the pointer control circuit 58 is to perturb the intermediate pointer signal P by adding or suppressing the required total of additional pointer changes singly or in bursts, so that the additional changes are superimposed on the regular sequence of the intermediate signal itself, to provide the desired irregular signal (in the specific example the required total is one). Thus this circuit can be considered to produce a 'perturbation' signal accounting for the desired additional or suppressed extra or empty bytes or bursts of such bytes, which is then combined with the intermediate pointer signal. It will be understood that in a particular implementation some of the above-described signals may constitute actual trains of pulses conducted through circuitry, or they may constitute sequences of actions performed by circuit components to produce the desired result.

Using the example given above, for a nominal interval between payload pointer changes of 100 ms (actual interval of 101.23 ms), in a measurement period of 30.36875 s there will be 300 opportunities for payload pointer changes. For a bit rate offset above the nominal rate by 246.079 Hz, the excess number of bits over the measurement period is 7473 (rounded); this is equivalent to 7473*(261/270)/8=903 excess bytes of payload data (the factor of 261/270 is included because only 261 out of every 270 bytes are actually used for payload—the remainder are used for overhead). Thus 3 'extra' bytes can be included (in the normally spare overhead locations), and the payload pointer decremented correspondingly, at each of the 300 pointer change opportunities, and 3 more 'extra' bytes are available for the required additional pointer change. For a bit rate offset above the nominal rate by 244.444 Hz, the excess number of bits over the measurement period is 7423 (rounded); this is equivalent to 7423*(261/270)/8=897 excess bytes of payload data. Thus 3 'extra' bytes can be included in the normally spare overhead locations, and the payload pointer decremented correspondingly, at each of 299 of the pointer change opportunities, leaving one pointer change opportunity which is not used, again as required.

Likewise, a bit rate offset below the nominal rate by 246.079 or 244.444 Hz provides a deficiency of 903 or 897 bytes respectively, so that 3 'empty' bytes can be included in the payload envelope (and the payload pointer incremented correspondingly) at each of 301 or 299 pointer change opportunities (i.e. 300 +/ −1).

It may be noted that although the operation of the circuit in FIG. 3 has been described in terms of the offset clock rate signal O being used to control the generation of data and the nominal clock rate signal N being used to control the generation of complete frames in the final output signal, the circuit is symmetrical in relation to these clock signals. Thus the circuit could also be operated with the nominal signal N being supplied to the first clock processing circuit 50 and the offset signal O being supplied to the second clock processing circuit 56 and the overhead generator 60.

The values for the ratio control signals supplied to the DDS 24 are calculated as follows:

(1) The frequency of the signal generated by the DDS 24$a$ is required to be offset by an amount that generates E extra (or fewer) bytes of data in the measurement period T; this offset is $$(8E/T)$$

relative to the unperturbed offset clock rate or $$(8E/T) * (270/261)$$

relative to the nominal clock signal N (taking account of the fact that only 261 out every 270 bytes in an STS-3 frame are used for payload data).

(2) For this offset to be exactly resolvable with the frequency resolution of the DDS, the measurement period T must be selected so that $$\text{offset/frequency resolution}$$

is an integer. The frequency resolution is given by $$F/R$$

where F is the clock input frequency and R is the digital resolution of the DDS. Thus $$(240 * E * R)/(t * 29 * F)$$

must be an integer. For the specific example of E=1 extra byte per measurement period, F=16.256 MHz and R=$2^{32}$, $$(240 * 2^{32})/(29T * 16256000)$$
$$= 2186.55/T \text{ (approx)}$$

must be an integer. For a measurement period of 30 s, a convenient value for T is 72 (although 73 is closer, 72 is selected as having more common factors with 240, to provide optimum resolution for the interval between pointer changes). This gives an actual duration for the measurement period of 2186.55/72=30.37 s. An exact value for T is given by T=(240*$2^{32}$)/(29*16256000*72).

(3) In order to obtain an integer number of pointer changes during the measurement period, the frequency f1 of the intermediate pointer signal P must be an integer multiple m of 1/T; in order for this number exactly to be produced by the DDS 24$b$, this frequency must also be an integer multiple k of the DDS frequency resolution F/R. Thus $$f1 = m/T = kF/R$$

So, if I is the largest common factor of k and m, K=k/I and M=m/I, $$R/FT = k/m = (I*K)/(I*M) = K/M$$

For the specific values of R and T given above, $$R/FT = (2^{32}/16256000)*(29*16256000*72)/(240*2^{32})$$
$$= 29*72/240$$
$$= 87/10 = K/M$$

Therefore $I=f1/(M/T)$ which for a nominal interval between pointer changes of 100 ms (=10 Hz) gives $$I=RINT(10*30.37/10)=30$$

where RINT indicates the operation of rounding to the nearest integer value. In this case, the actual interval between pointer changes will be $$1/f1 = T/(M*I) = 30.37/(10*30) = 101.23 \text{ ms}$$

(4) The number of pointer changes in the measurement period is $$m = I*M = 30*10 = 300$$

Accordingly, to produce three additional 'empty' or 'extra' bytes of data in the measurement period for an STS-3 signal, the frequency difference o of the offset clock signal O from the nominal STS-3 clock frequency must be $$o = 3*270/261*8*(m+1)/T = 3*270/261*8*301/30.3-7 = 246.079 \text{ Hz}.$$

A similar calculation for three fewer bytes yields $$o = 3*270/261*8*(m-1)/T = 3*270/261*8*299/30.3-7 = 244.444 \text{ Hz}$$

(5) The ratio control value for the DDS 24a is shifted from the value r (which yields the nominal clock rate) by $$o/(F/R)/4$$

For the excess data case this is $$= 3*270/261*8*(m + 1)*R/(F*T*4)$$
$$= 180*(m + 1)*K/(29*M)$$
$$= 54*(m + 1)$$

where the division by four takes account of the effect of the multiplier 31. Similarly for a deficiency (one pointer change suppressed) the value is $$54*(m-1)$$

Thus for the case of one additional pointer change the shift is $$54*301 = 16254$$

and for the case of one suppressed change the shift is $$54*299 = 16146$$

(6) The actual ratio control value for the DDS 24b is $$f1/(F/R) = f1*R/F$$
$$= M*I*R/T*F$$

$$= M*I*K/M$$
$$= I*K$$

so for an interval of 101.23 ms the value is $30*87=2610$.

(7) The values for other intervals t between pointer changes in this example can be calculated from $$I = RINT((T/M)/t)$$
$$m = M*I$$
DDS ratio shift (additional pointer change) = $\pm 54*(m + 1)$
DDS ratio shift (one pointer change suppressed) = $\pm 54*(m - 1)$
DDS ratio for pointer change signal = $I*K$ The relationship between pointer change direction (increment or decrement), choice of extra or suppressed changes, and the direction of the frequency offset is summarized in the following table:

| Pointer change direction | Type of additional change | Main frequency offset | Additional frequency offset |
| --- | --- | --- | --- |
| −ve | Extra | +ve | +ve |
| −ve | Suppressed | +ve | −ve |
| +ve | Extra | −ve | −ve |
| +ve | Suppressed | −ve | +ve |

The 'main frequency offset' indicates the sense (+ve or −ve) in which the DDS ratio shift is to be applied, relative to the value for the nominal clock signal N, to obtain the offset clock signal O; the 'additional frequency offset' indicates whether the (m+1) or (m−1) offset is to be used.

I claim:

1. A signal generation method for generating a first signal which controls application of test signals to a communications means, said first signal including events occurring at a first predetermined frequency f1 and such that all events occurring in a predetermined time interval have a predetermined mean frequency f2 which is in an exact predetermined ratio to a difference frequency df between frequencies of second and third signals, comprising the steps of:
    generating a fourth signal at a frequency f3;
    generating from said fourth signal a fifth signal at a frequency f3+df;
    deriving said second signal from said fourth signal and said third signal from said fifth signal;
    generating, from said fourth signal, an intermediate signal at said frequency f1 and in a predetermined ratio to said difference frequency df;
    generating a perturbation signal which has a mean frequency over said predetermined time interval which is equal to the difference between said frequencies f1 and f2;
    combining said intermediate and perturbation signals to form said first signal; and
    employing said first signal to control application of test signals to a communications means.

2. The method of claim 1, wherein said signals comprise trains of pulses and said events comprise pulses in said first signal.

3. The method of claim 1, including the steps of:
    entering data into an elastic store at a rate proportional to the frequency of one of said second and third signals; and extracting data from said store at a rate proportional to the frequency of the other of said second and third signals, and with control of flow of data from said elastic store being dependent at least upon said first signal.

4. The method of claim 1, including the steps of:

generating a gapped version of said second signal in dependence at least upon said first signal; and clocking a data generator with said gapped version of said second signal such that the data rate is proportional to said third signal.

5. The method of claim 1, wherein said fifth signal and said intermediate signal are generated from said fourth signal by phase accumulation.

6. Test apparatus for generating a first signal including events occurring at a first predetermined frequency f1 and such that all events occurring in a predetermined time interval have a predetermined mean frequency f2 which is in an exact predetermined ratio to a difference frequency df between frequencies of second and third signals, comprising:

oscillator means for generating a fourth signal at a frequency f3;

first synthesizer means coupled to said oscillator means for generating from said fourth signal, a fifth signal at a frequency f3+df;

mixer means coupled to said oscillator means and said first synthesizer means for deriving said second signal from said fourth signal and said third signal from said fifth signal;

second synthesizer means coupled to said oscillator means for generating, from said fourth signal, an intermediate signal at said frequency f1 and in a predetermined ratio to said difference frequency df;

control means coupled to said second synthesizer means for generating a perturbation signal which has a mean frequency over said predetermined time interval which is equal to the difference between said frequencies f1 and f2, and for combining said intermediate and perturbation signals to form said first signal.

7. The apparatus of claim 6, wherein said signals comprise trains of pulses and said events comprise pulses in said first signal.

8. The apparatus of claim 6, further including:

generator means for entering data into an elastic store at a rate proportional to the frequency of one of said second and third signals; and means for extracting data from said store at a rate proportional to the frequency of the other of said second and third signals, and with control of flow of data from said elastic store being dependent at least upon said first signal.

9. The apparatus of claim 6, further including:

generator means for generating a gapped version of said second signal in dependence at least upon said first signal; and means for clocking said generator means with said gapped version of said second signal such that the data rate is proportional to said third signal.

10. The apparatus of claim 6, wherein said fifth signal and said intermediate signal are generated from said fourth signal by phase accumulation.

* * * * *